Feb. 15, 1955
E. M. WAYLAND
2,702,119
FRUIT SIZING MACHINE
Filed Jan. 22, 1951
2 Sheets-Sheet 1
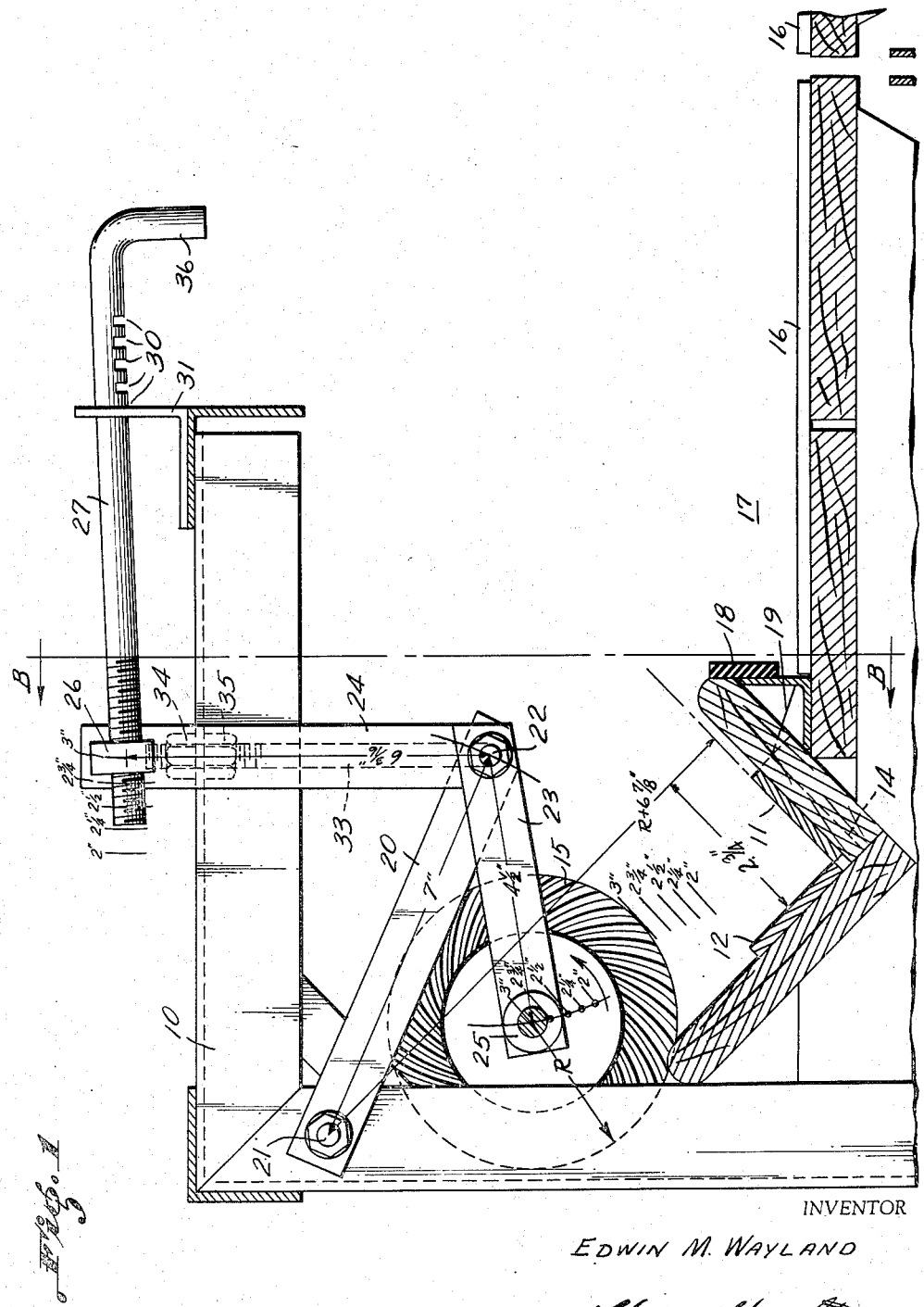
INVENTOR
EDWIN M. WAYLAND
BY
ATTORNEY

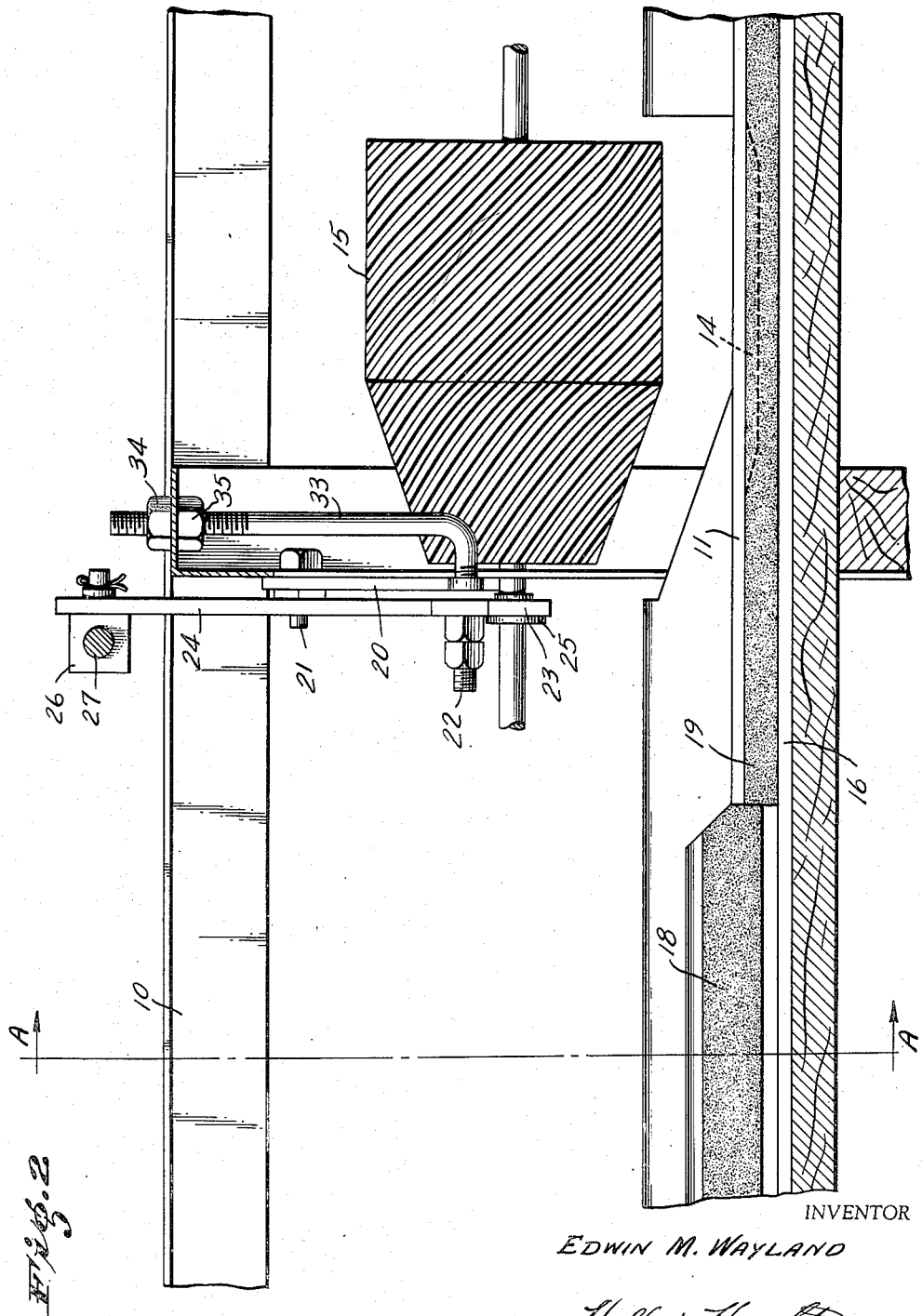

United States Patent Office
2,702,119
Patented Feb. 15, 1955

2,702,119

FRUIT SIZING MACHINE

Edwin M. Wayland, Covesville, Va.

Application January 22, 1951, Serial No. 207,107

8 Claims. (Cl. 209—91)

This invention relates to sizing machines of the type exemplified in my prior Patents Nos. 1,673,172 and 2,285,955, and aims generally to improve the mechanism for adjustably positioning the ejector wheels of such machines.

Prior to my Patent No. 1,673,172 an ejecting wheel in this type of machine was mounted on a simple pivoted arm adjustable to swing it on an arc calculated to cause the wheel surface, for different sizes of fruit, to contact the fruit (considered as spherical) at a point diametrically opposite the sizing belt carrying the fruit along the sizing trough.

In my prior patents above identified, the wheel is set relative to the back wall of the trough by an amount fixed by adjustment of a horizontally movable plate that carries the pivot point and an adjusting means for the wheel supporting arm. A rearward movement affords a more gentle ejection of the fruit at a sacrifice of accuracy. Due to vibration the arrangements of these prior patents had to be very tightly clamped and as a result adjustments were rendered difficult and freezing of the clamping nuts and cotter pins was common.

Furthermore, while the size adjustments in the machines of these prior patents did swing the wheel axes to produce substantially diametrical contact on fruit of various selected sizes, the adjustment of the size was awkward, and whenever any adjustment of the gentleness control was made (by loosening of the nuts clamping the horizontally slidable plate, moving the latter and retightening the nuts) this completely upset the size adjustment and required resetting thereof to compensate for the size error introduced.

Important objects of the present invention, severally and interdependently, are to provide an adjusting mechanism that is easily and quickly adjusted for selection of different sizes of fruit; one having an improved arrangement that facilitates vernier adjustment of the size to compensate for variation in shape of particular varieties of fruit (as the variation between short broad apples and long nosed ones); one in which the size selecting adjustments are self-maintained without need of clamping screws or cotters, so that they may be altered at will without loosening or removal of nuts and cotters; one eliminating the freezing of nuts and cotters previously experienced; and one in which the gentleness adjustment may be varied within the normal range without materially changing the size of fruit selected by the wheel. Other objects are to simplify and render more fool-proof the entire adjusting mechanism and its respective parts and to provide special arrangements and features contributing to the realization of respective ones of the foregoing objects.

The invention resides in the novel features and combinations exemplified in the following detailed description of a preferred embodiment thereof, and is defined in the appended claims.

In the accompanying drawings of the exemplary embodiment,

Fig. 1 is a partially diagrammatic cross section through a sizing machine taken on the line A—A of Fig. 2 looking toward the sizing wheel from the direction of approach as indicated by the arrows.

Fig. 2 is a partially diagrammatic longitudinal section taken on the line B—B of Fig. 1, looking in the direction of the arrows.

In the illustrative embodiment, the sizing machine comprises a frame 10 for supporting the sizing trough and the means for discharging selected sizes of fruit therefrom. The machine is particularly intended to gauge the fruit by their maximum transverse diameters, and accordingly comprises means for spinning the fruit about their core axes to turn up such maximum diameters to the ejecting means. In the form shown this means comprises a longitudinally movable sizing or fruit spinning belt 11 and a cooperating supporting surface 12 rearwardly thereof, arranged to form a substantially right angled V-shaped sizing trough. The supporting surface 12 may be of any suitable form, a stationary surface being employed in my aforesaid prior patents, but it preferably comprises a canvas or rubberized canvas booster belt, as shown in Fig. 1. The booster belt, as described in copending application Ser. No. 137,128, filed January 6, 1950, now Patent Number 2,630,223, preferably has a relatively low friction surface characteristic, as compared to a relatively high surface friction characteristic of the sizing belt 11, and moves longitudinally at a rate equal to one-third the speed of the sizing belt. Fruit placed in the so arranged trough upends against the booster belt with maximum facility, rotates about its core axis with a minimum of jiggling and sliding friction, and advances through the machine at maximum speed commensurate with proper rotation of the fruit, as explained in said copending application.

At each sizing station, as is best shown in Fig. 2, the member 13 supporting the sizing belt is preferably cut away as at 14 below the ejector wheel 15 to prevent pinching of the fruit being ejected thereby. The ejector wheel itself is preferably of the high friction type disclosed in my prior Patent No. 2,285,955. Other appurtenances, such as fruit circulating belts 16 in the fruit receiving bins 17, and rubber or other anti-bruising pads and ramps 18 and 19, may also be employed, as will be appreciated by those skilled in the art.

In the exemplary form of the invention the machine is constructed to gauge for maximum transverse diameter, and eject, various varieties of apples of markedly different shapes. For purposes of illustration the drawings show the machine arranged for gauging fruit ranging in size from 2" to 3" diameters, in quarter inch steps. By placing the ejecting mechanism at different distances from the sizing trough, for example, fruit of different sizes may be handled at will.

As above mentioned, in the sizing of fruit on maximum diameters, the fruit contacting surface of the ejector 15, for maximum accuracy should contact the fruit at its girdle plane of maximum transverse diameters. Considering the fruit as a sphere, this would mean that in theory the fruit contacting line of wheel 15 should lie, for any given size fruit, one chosen fruit diameter distant from the sizing belt 11 and one chosen fruit radius distant from the cooperating supporting surface 12 arranged at right angles thereto. In practice, the 1-diameter measurement is adhered to but is moved down a little over the cut out portion 14, as by vernier adjustment of the size control as hereinafter described, and the 1-radius measurement is departed from somewhat depending on the shape and tenderness of the fruit, to obtain contact at or close to the girdle plane of the fruit and a proper balance between accuracy and gentleness of ejection. However, whatever the settings selected, in adjusting the wheel for various sizes, it is preferably moved, within its normal range of adjustment, along a line lying closer to the supporting surface 12 than to the sizing belt 11, and at approximately a 50% grade with respect to the plane of the supporting surface 12. In the illustrative embodiment, as in practice, the axis of the sizing wheel 15 is swung along an arc, shown in Fig. 1, which approximates the 50% slope within the 1-unit range (from 2" to 3" in the form shown) of size adjustments contemplated.

The sizing wheel itself may be of any suitable radius R and may be operated at any suitable speed. Appropriate sizes and speeds are well known to those skilled in the art.

In accordance with the present invention size adjusting means is provided for moving the wheel 15 within the said range and for securing it at adjusted positions therein and gentleness adjusting means is also provided for moving the wheel 15, at any size adjusted position within said range, along a trace (indicated by each of the lines 2", 2¼" etc. extending from the arc passing through the axis of the wheel) that lies substantially parallel to the surface of the sizing belt 11.

To provide these means the adjusting mechanism comprises a supporting arm 20 of about 7-units length pivoted to the frame at a point 21 located above the trough and in a plane parallel to and spaced, for the size range described, about 2¾ units from the plane of the supporting surface 12 and at a distance of about R plus 6⅞ units from the sizing belt 11. As shown, the arm 20 extends downwardly and forwardly from the pivot point 21 at an angle of approximately 25° more or less to horizontal. At its lower end the arm 20 is provided with pivot means 22 on which is pivotally mounted a bell crank or triangular lever 23—24 having rearwardly and upwardly extending lever arms 23 and 24 arranged at an angle of about 100° to each other. The rearwardly extending lever arm or leg 23 has a length of about 4½ units and carries a journal 25 in which the sizing wheel 15 is rotatably mounted. The upwardly extending arm or traction leg 24 of the bell crank lever 23—24 has a length in the form shown of about 6³⁄₁₆ units and has a pivot element 26 mounted in its upper end. In the form shown the bell crank 23—24, for economy, is made up of two separate elements welded together adjacent the pivot point 22, but may be formed in other ways. As shown, the upwardly extending lever arm 24 when placed near the upper end of its size adjustment range lies substantially vertically, and an adjusting rod 27 which is hinged by being threaded through the pivot 26 at one of its ends, extends substantially at right angles to arm 24, thus extending approximately horizontally in the form shown. At a region lying approximately 5¾ to 7¼ units from the pivot 26, means is provided for rockingly securing the rod 27 at selected points corresponding with predetermined size adjustments, this means in the form shown being an abutment means, preferably comprising a series of notches 30 formed in the under side of rod 27 and located to correspond to the desired wheel spacings and an anchor means or keeper 31, shown as an apertured plate carried by frame 10 and through which rod 27 loosely passes, selectively engageable with respective ones of said notches.

Means is provided for changing the angle of the supporting arm 20 and for securing the same in adjusted angular position, this means in the form shown comprising a gentleness adjusting rod 33 bent at its lower end to provide the pivot 22 and extending substantially vertically therefrom, and adjustably secured at its upper end as by passing through an aperture in the frame 10 and being secured therein by upper and lower lock nut means 34—35, threadedly engaged on the rod.

As will be apparent from the arcs and traces diagrammatically shown on Fig. 1, with any given setting of the gentleness adjustment 33—35 a change in size adjustment may be effected by simply lifting the size control rod 27 to free it from the anchor plate 31 and then sliding it to the desired new position where its appropriate notch may be dropped into engagement with the anchor 31. With the arrangement shown vibration resulting from contact of the wheel with fruit being ejected or from other sources and transmitted through the bell crank 23—24 is transmitted only longitudinally through rod 27 so that there is no tendency for this rod to lift its notch from the anchor plate 31, and the size adjustment is thus maintained merely by the action of gravity and without need for use of lock nuts, cotter pins, or other troublesome securing devices.

When a predetermined size has been selected by engagement of the appropriate notch 30 with the anchor 31, vernier adjustment may be effected simply by rotating the handle 36 of rod 27 to threadedly extend or advance the rod through the pivot element 26. When threaded with twenty threads per inch and constructed on inches as the unit of measurement above referred to, each complete turn of rod 27 affects a ¹⁄₃₂" adjustment of the size selected. The handle 36 extending downwardly from rod 27 acts as weighting means to prevent accidental turning of the rod.

For any given setting of rod 27 adjustment of the gentleness control nuts 34—35 raises and lowers the entire wheel supporting assembly between the pivot 21 and the fulcrum point where rod 27 is engaged with the anchor 31. The pivot 26 thus swings along one of the family of arcs diagrammatically indicated in Fig. 1 about the center afforded by the last mentioned fulcrum point, while the bell crank supporting pivot 22 swings on the oppositely directed arc drawn therethrough about the pivot point 21. With the parts properly proportioned as exemplified by the relationships set forth above, the swinging movement about pivot 21 in conjunction with that about the fulcrum point of rod 27 effects movement of the axis of the wheel 15 along one of a family of traces indicated adjacent the axis of the wheel. As indicated, with the arrangement shown the traces of this family are substantially parallel to the surface of the sizing belt 11 within the range of gentleness adjustment desired, which usually does not exceed approximately a half of a unit. As will be apparent from the second family of traces indicated tangent to the surface of wheel 15 and therebelow, the aforesaid movement has the effect of raising and lowering the fruit contacting surface of the wheel with respect to the supporting surface 12 along traces substantially parallel to the surface of the sizing belt 11 within the range of gentleness adjustment needed to accommodate various varieties of fruit. As it is usually necessary to adjust the gentleness control only when changing from one variety of fruit to another there is no great inconvenience in effecting this adjustment by means of lock nuts 34 and 35, but other adjusting means may be provided if desired.

Referring again to the machines of my prior patents above mentioned, it will be perceived that when any station of such a machine was found to be ejecting fruit too roughly on the one hand, or contacting it so gently as to fail to tilt it from the trough on the other, it was not practicable to correct the fault without stopping the flow of fruit through the machine, because on loosening the slide and attempting to correct the gentleness adjustment, a radical change was simultaneously made in the size of fruit ejected at the station. Thus in practice, with such machines it was necessary to stop the flow of apples throughout the entire machine and then adjust alternately the gentleness and size controls using only a few test apples until the proper balance between gentleness and accuracy was obtained.

With the present invention since adjustment of the gentleness control does not alter the size adjustment, it becomes possible to adjust the balance between accuracy and gentleness without stopping flow of fruit through the machine, and thus without causing the considerable number of packers being supplied by the machine to stand idle. Thus the present arrangement affords a marked economic advantage over those of my prior patents, both from the standpoint of lost time, and that of getting the pack prepared on shipping schedule.

From the foregoing description it will be appreciated that the several features and combinations of the invention may be embodied in specific forms other than those illustrated without departure from the principles of essential characteristics of the invention as disclosed herein. The embodiments shown are accordingly to be considered as illustrative and not restrictive of the invention, the scope of which is defined in the appended claims. All modifications and changes which come within the meaning and range of equivalency of the claims are therefore intended to be included therein.

I claim:

1. A sizing machine comprising a sizing belt and a cooperating support rearwardly thereof arranged to form a substantially right-angled V-shaped sizing trough, an ejector wheel of R units radius supported above said trough and movable to space its surface at various distances from the surface of said sizing belt spread over a range of approximately 1 unit more or less, and means for adjustably supporting said wheel comprising a supporting arm of about 7 units length pivoted above said trough on an axis located in a plane parallel to and spaced about 2¾ units from the plane of said supporting surface at a distance of about R plus 6⅞ units from said sizing belt and extending downwardly and forwardly therefrom at an angle of approximately 25° more or less to horizontal, bell crank means pivotally mounted on the lower end of said supporting arm and having upwardly extending and rearwardly extending lever arms arranged at an angle of about 100° to each other, said rearwardly extending lever arm having a length of about 4½ units and rotatably carrying said sizing wheel, and said upwardly extending lever arm having a length of about 6 3/16 units and having a pivot at its upper end, an adjusting rod connected to said pivot and extending forwardly at approximately right angles thereto, means for rockingly securing said rod at selected points spaced from said pivot within a range of approximately 5 3/4 to 7 1/4 units from said pivot, and means for changing the angle of said supporting arm and securing the same in adjusted angular position.

2. As a sub combination of a sizing machine having an ejector wheel; means for adjustably supporting said wheel comprising a supporting arm of about 7 units length adapted to be mounted on a pivot and to extend downwardly and forwardly therefrom at an angle of about 25° more or less to horizontal, bell crank means and pivot means for mounting the same on the lower end of said supporting arm, said bell crank means having a wheel supporting arm about 4 1/2 units long and a traction arm about 6 3/16 units long arranged at an angle of about 100° to each other, hinged extensible adjusting rod means and means for connecting the same to said traction arm to extend forwardly at about right angles thereto, means for adjustably and rockably securing said adjusting rod, and means for adjustably supporting said supporting arm.

3. A sizing machine of the type that comprises a sizing belt, a cooperating support arranged to form a substantially right angled sizing trough therewith, an ejector wheel supported above said trough and movable to position its surface at distances within a range of fruit diameters from the surface of said sizing belt, and means for moving the wheel to and securing it at various positions within said range; particularly characterized in that the wheel positioning means includes a size adjusting controller and a gentleness adjusting controller each acting without altering the adjustment established by the other, the gentleness adjusting controller moving the wheel axis toward and away from said cooperating support in a direction parallel to the plane of the sizing belt and the size adjusting controller moving the wheel axis toward and away from said sizing belt in a direction at an angle of about 27° to the cooperating support.

4. A sizing machine comprising a sizing belt, a cooperating support arranged to form a substantially right angled sizing trough therewith, an ejector wheel supported above said trough and movable to position its surface at distances within a range of fruit diameters from the surface of said sizing belt, and means for moving the wheel to and securing it at various positions within said range, said last named means comprising a lever pivoted at one end to a support rearwardly of said cooperating support and above the same and extending forwardly to a position above said sizing belt, a bell-crank centrally pivoted to the forward end of said lever with one of its arms extending rearwardly and downwardly and its other arm extending generally upwardly from said central pivot, said sizing wheel being rotatably mounted at the rearward end of said one arm, a forwardly projecting extensible adjusting rod hingedly connected to the upper end of said other arm and provided with means spaced forwardly of said hinged connection for selectively engaging a fulcrum, a fulcrum for selected engagement by said engaging means to alter the size of fruit to be ejected, and means for raising and lowering the forward end of said lever to rock said bell-crank in a manner determined by the arcs of movement of the ends of said other arm about said support and said fulcrum for controlling the gentleness of fruit ejection.

5. A sizing machine according to claim 4, said raising and lowering means comprising a rod extending substantially vertical from the point at which said bell-crank is pivoted to said lever, and adjustably secured at its upper end.

6. A sizing machine according to claim 4, said extensible adjusting rod being threadedly extensible relative to said hinged connection and having a series of fulcrum engaging notches near its forward end, and said fulcrum comprising an upwardly facing abutment for engagement selectively in said notches.

7. A sizing machine according to claim 4, in which said lever, one arm, other arm, and extensible rod have relative lengths approximately in the proportions of about 7, 4 1/2, 6 3/16, and 5 3/4 to 7 1/4 units, respectively, said bell-crank having an angle of about 100° and said lever extending forwardly and downwardly at an angle of about 25° to the horizontal when said extensible rod extends approximately horizontally, whereby adjustment of said gentleness adjusting means moves said wheel axis substantially parallel to the plane of the sizing belt for any adjustment of said extensible rod within its size adjusting range.

8. An improved mechanism for adjusting the size and gentleness of fruit ejection in a fruit sizing machine of the type comprising a V-shaped sizing trough having a sizing wall and a back wall arranged at right angles to each other for supporting fruit with its stem axis about normal to the back wall, an ejector wheel adjustably positioned above said trough, and mechanism for adjusting the spacing of the wheel from the two walls of the trough for determining the diameter of fruit ejected by it and the gentleness of ejection thereof; said improved mechanism particularly characterized in that it comprises a size adjusting device and a gentleness adjusting device each operable without materially affecting the relationship established by the other, said size adjusting device comprising means for moving the axis of the sizing wheel along a path inclined at approximately a 50% grade with respect to the plane of the back wall to simultaneously adjust its distance from both walls and alter the size of fruit ejected while not appreciably altering the gentleness of ejection as set by the gentleness adjusting device, and said gentleness adjusting device comprising means for moving the wheel axis in a direction parallel to the plane of the sizing wall without appreciably varying its spacing therefrom as set by the size adjusting device.

References Cited in the file of this patent

UNITED STATES PATENTS

| Number | Name | Date |
|---|---|---|
| 888,408 | Strain | May 19, 1908 |
| 931,993 | Cary | Aug. 24, 1909 |
| 1,334,910 | Kuntz | Mar. 23, 1920 |
| 2,285,955 | Wayland | June 19, 1942 |